Jan. 26, 1943.                H. P. SMITH                2,309,221
                POWER ARRANGEMENT FOR TRACTOR IMPLEMENTS
                Filed Sept. 23, 1940           2 Sheets-Sheet 1
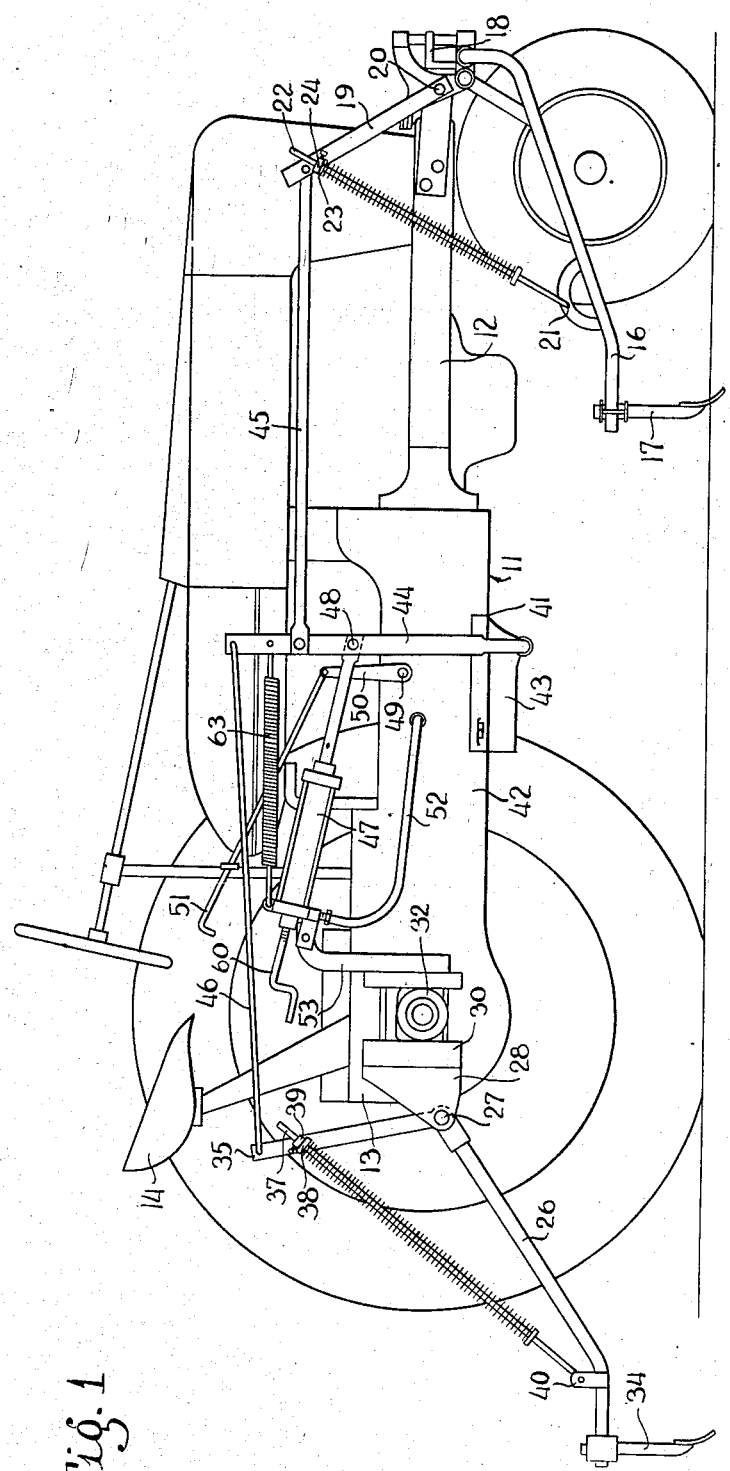
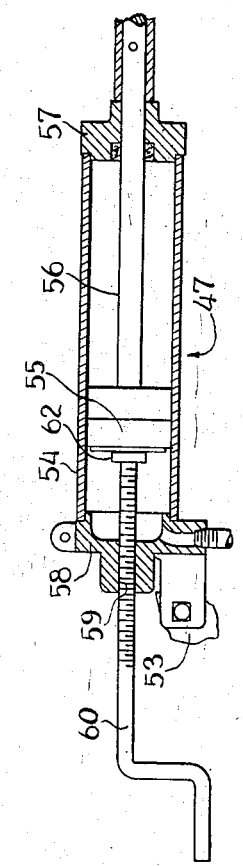
Inventor
Hiram P. Smith
By Paul O. Pippel
Atty.

Jan. 26, 1943. H. P. SMITH 2,309,221
POWER ARRANGEMENT FOR TRACTOR IMPLEMENTS
Filed Sept. 23, 1940 2 Sheets-Sheet 2

Inventor
Hiram P. Smith
By Paul O. Pippel
Atty

Patented Jan. 26, 1943

2,309,221

UNITED STATES PATENT OFFICE 2,309,221

POWER ARRANGEMENT FOR TRACTOR IMPLEMENTS

Hiram P. Smith, Canton, Ill., assignor to International Harvester Company, a corporation of New Jersey Application September 23, 1940, Serial No. 357,900

8 Claims. (Cl. 97—50)

This invention relates to tractor-mounted implements, and more particularly to a fluid power arrangement associated with the tractor for moving the implements from one position to another position.

An object of the invention is to provide a simplified fluid power arrangement wherein there is a fluid actuated means for moving the implements located at one side of the tractor independent of a fluid actuated means for moving implements at the other side of the tractor.

Another object of the invention is to provide an adjusting means associated with and carried by the individual fluid actuated means whereby, upon the mounting of the actuated means upon the tractor, the adjusting means will be simultaneously mounted, thereby making it unnecessary to connect separately to the tractor the manual adjusting means for the adjusting of the working depth of the implements.

It is another object of the invention to provide an arrangement which is simple in construction and particularly adapted for the moving of implements located respectively on the forward and rearward portions of the tractor and wherein this actuated means may be conveniently located with respect to the operator's station on the tractor to make the same readily accessible to the operator.

It is a further object of the invention to provide on the tractor a fore and aft movable lever located intermediate the forward and rearward portion of the tractor and connected respectively to the implements located upon those portions wherein power means may be readily adapted for the attachment to the lever and removal therefrom without disconnecting the principal connections between the lever and the respective implements.

According to the present invention, there has been provided an arrangement wherein implements located respectively upon the forward and rearward portions of the tractor are connected directly to a vertically extending fore and aft movable lever located intermediate the length of the tractor. There is provided such a pivoted lever at each side of the tractor, whereby the movement of implements on their respective sides of the tractor may be effected by individual power actuated means located at each side of the tractor with one of said actuated means for each pivotal lever. The fluid actuated means is of a single acting cylinder piston type adapted to receive fluid from a source provided on the tractor. The fluid actuated means may extend longitudinally of the tractor and be connected to the tractor in such a manner that the manually adjustable stop means associated with the same will be accessible to the operator located at the operator's station at the rear of the tractor. The adjustable stop means is carried by the fluid actuated device or by the cylinder part of the device. This adjusting means takes the form of an adjustable screw threaded into the head portion of the cylinder part and adapted to be engaged by the piston part of the power actuated device when the implements are in their ground-working position. The effect of this adjusting screw is to limit the amount of stroke of the working piston and at the same time to provide means for the adjusting of the working depth of the implements. The piston part is held against the adjustable stop means by means of a biasing spring and in that way the tendency of the implements to leave the ground during the working of the same is overcome.

For other objects and for a better understanding of the invention, reference may be had to the following detailed description taken in connection with the accompanying drawings, in which:

Figure 1 is a view in elevation of a tractor with one of its rear wheels removed and with the fluid power arrangement for the moving of implements, located on the forward and rear portions of the tractor, illustrated to the best advantage;

Figure 2:
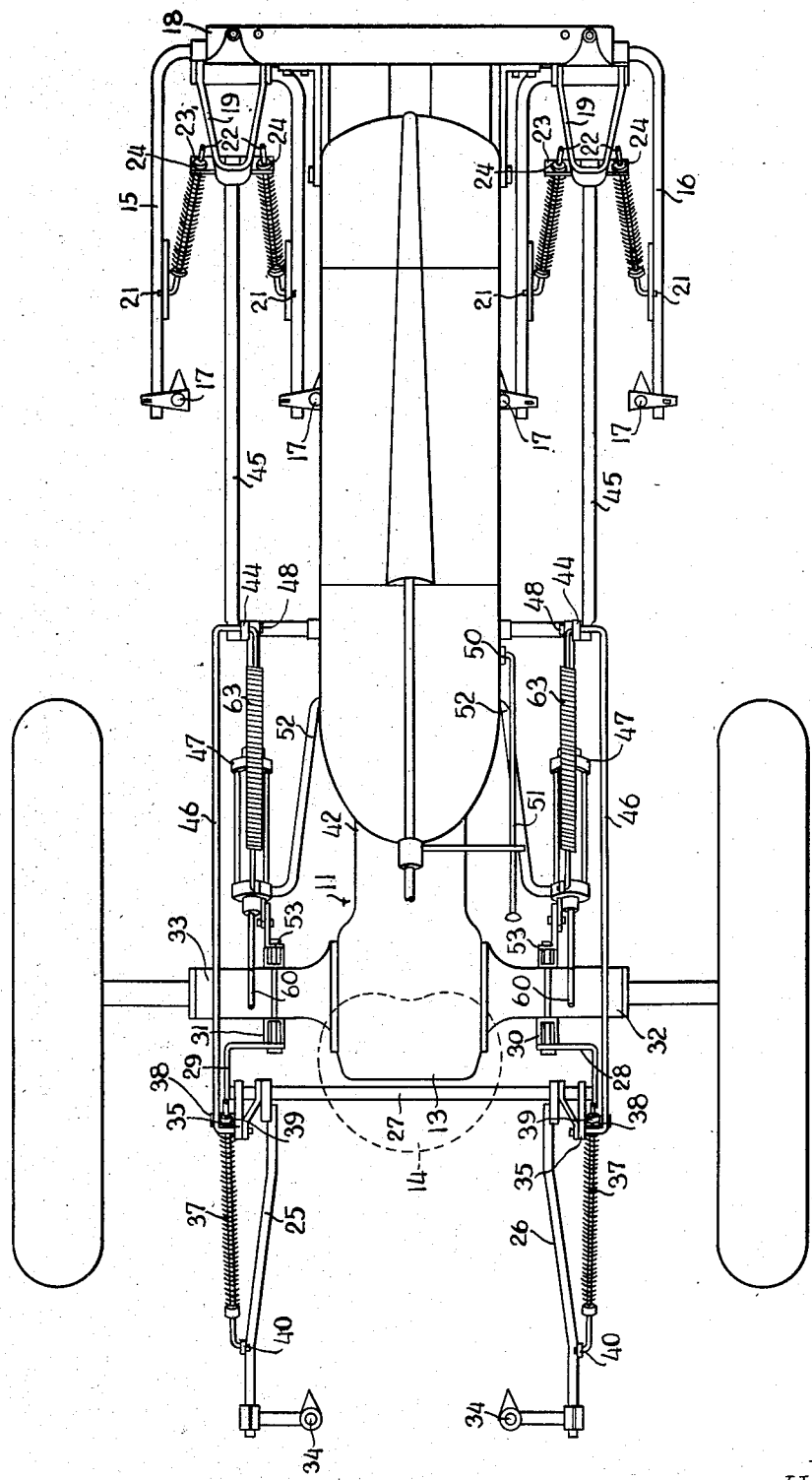
Figure 2 is a plan view of the same tractor and showing the arrangement as adapted for the implements located at both sides of the tractor; and, Figure 3 is a detail view of the adjustable stop mechanism carried by the cylinder part of the fluid actuating means and illustrating the engagement of the piston part therewith.

Referring to the figures, there is shown in general a tractor, or supporting frame, 11, having a forward portion 12 and a rearward portion 13, with an operator's station 14 thereon. Connected to the forward portion 12 of the tractor are implements 15 and 16 located respectively at each side of the tractor. One of these implements may include, as illustrated more clearly in Figure 2, a pair of implement rigs having working tools 17 adapted for the cultivation of the ground. The implement rigs may be respectively pivoted to a transverse structure 18 located on the forward portion of the tractor and thereby adapted to have vertical movement to and from their ground-working position. As a means for effecting upward movement of the implement rigs, there may be provided a lever 19 pivoted at its lower end as indicated at 20 to the transverse structure 18, and having its upper end connected to the rig beam at 21 by means of a lift rod 22. The connection of the lift rod 22 with the upper end of the lever 19 may be effected by the provision thereon of a laterally extending flange 23 through which the rod 22 may slide. On this rod 22 there may be provided a collar 24 which will engage with the flange during any forward pivotal movement of the lever 19 about its pivot point 20 to thereby effect lifting movement of the implement rigs.

On the rear portion 13 of the tractor there may be pivoted the rear implements 25 and 26 to a transverse supporting shaft 27 carried by brackets 28 and 29 secured respectively by quick attachable and detachable connection means 30 and 31 to the transverse axle portions 32 and 33 forming a part of the rear portion 13 of the tractor. These rear implements may have cultivating shovels or working tools 34. As a means for lifting of the rear implements 25 and 26, there may be provided respectively at opposite sides of the tractor lifting arms 35 likewise pivoted to the transverse shaft 27. Lifting may be effected through the lift rods 37 connected near to the free end of the levers 35 in a similar manner to the connection of the lift rods 22 with their respective levers, the lever being provided with a flange 38 and the rod 37 being provided with a collar 39 adapted to be engaged by the flange 38 during forward pivotal movement of the levers 35. The lower end of the lift rods 37 are connected respectively at 40 to the rear implements 25 and 26. Pressure springs may be provided respectively on the lift rods 22 and 37 and operable in the well known manner to supply spring pressure for holding the working tools 17 and 34 in their ground-working position. These pressure springs are operable when the lift levers 19 and 35 are rigidly held in their rearward position.

The tractor 11 includes a hollow body portion 41 adapted to receive a reservoir and fluid supply housing 43. This housing 43, when fixed to the tractor body portion 42, will be located substantially intermediate of the forward and rearward ends of the tractor and well under the same for the connection thereto of fore and aft movable levers 44 extending vertically and with one at each side of the tractor.

Each of these levers extends vertically a substantial distance to provide means for connection of rods 45 and 46 respectively with the upper ends of the forward and rearward levers 19 and 35. When the rod connections 45 and 46 are made with the levers 44, there is provided a main connection means with the implements to which a fluid power actuated means or device 47 may be readily attached, as at 48, to thereby effect simultaneous movement of the forward and rear implements when the fluid actuated means is operated.

The housing 43 may extend some distance vertically upwardly within the hollowed body portion 42, and through the body portion wall there may project a control shaft 49 adapted to be operated by an arm 50 having a control rod 51 extending forwardly from the upper end thereof to a location near to the operator's station 14 on the rear portion of the tractor. Also extending through the tractor body wall are fluid hose connections 52 adapted respectively for connection with the fluid actuated means 47, there being two of such fluid actuated means, one at each side of the tractor, and each of which is connected to the respective intermediate levers 44. The rear ends of the fluid actuated means 47 may be connected to the rear axle portions 32 and 33 by a bracket structure 53 carried respectively by the quick attachable bracket structures 30 and 31 on the rear axle housings of the tractor. By so connecting the fluid actuated means, so that it will be supported by the bracket structures 53 located on the rear axle housings, the fluid actuated means will be located near to the operator's station 14 and readily accessible to the operator.

Referring now particularly to Figure 3, there is shown the fluid actuated means 47 as having a cylinder part 54 and a piston part 55 relatively movable within the cylinder part 54. The piston part 55 may include a piston rod 56 slidable through a head portion 57, forming a part of the cylinder 54, for connection with the intermediate lever 44 at a location thereon indicated at 48.

The cylinder part 54 also includes a rear head portion 58 having a threaded opening 59 through which extends a manually operable adjusting screw means 60 having a head 62 adapted to be engaged by the piston part 55. This adjustable screw serves as a stop means for limiting the rearward movement of the piston part 55. By connecting to the head portion 58 a biasing spring 63, connected at its forward end to the intermediate lever 44, the piston part 55 will be normally held against the head 62 forming a part of the manually adjustable stop means 60. This biasing spring means 63, upon pulling the piston part 55 home for engagement with the adjustable stops, will provide a certain rigidity in the connection means so that the pressure springs on the lift rods 22 and 37 will be effective for serving to retain the working implements in their ground-working positions. Thus, by the use of the biasing means 63 with the single acting fluid actuated means, there is provided thereby an arrangement that gives the effect of a double acting arrangement.

It should now be apparent that this adjusting means forms a part of the fluid actuated means and that, by so locating the fluid actuated means on the tractor as to be near to the operator's station 14, the manually adjustable stop means will be readily accessible to the operator and will also be removable with the fluid actuated means, thereby making it unnecessary to provide a means separate from the usual fluid actuated means which would necessitate separate removal of the respective parts.

By adjusting the adjustable screw 60, the amount of stroke of the piston part 55 will thereby be limited and the working tools will be more or less effective upon the cultivation of the ground as desired by the operator. The maximum amount of stroke made possible by the stop means being fully withdrawn may be reduced by adjusting the screw inwardly into the cylinder part.

It should be further apparent that, since there are individual fluid actuated devices at the respective sides of the tractor, and since there are individual connecting means including the pivotal levers 44 adapted to be moved by the individual actuated devices, the implements at one side of the tractor may be adjusted independently of the implements at the opposite side of the tractor. When the control rod 51 is actuated, both of the fluid actuated devices will be expanded to effect simultaneous lifting of all of the implements, but the individual manual adjusting screws carried by the fluid actuating means serve as means whereby implements at the respective sides of the tractor may be independently adjusted.

While various changes may be made in the detail construction of the arrangement, it shall be understood that such changes shall be within the spirit and scope of the invention as defined by the appended claims.

What is claimed is:

1. In combination, a tractor having forward and rearward portions, implements mounted respectively on the forward and rearward portions of the tractor for vertical movement from one position to another position, a lever pivoted on the tractor for fore and aft movement intermediate the forward and rearward portions of the tractor, connections for respectively connecting the implements with the lever, and a fluid power arrangement for lifting the implements including a fluid actuated device adapted to have a maximum actuating stroke, and means associated with the fluid actuated device to alter the amount of stroke, whereby the implements may be adjusted in one of their positions.

2. In combination, a tractor, an implement connected to the tractor for vertical movement to and from its ground-working position, a fluid power arrangement for moving the implement including a single acting fluid actuated device having cylinder and piston parts, a manually adjustable stop means carried by the cylinder part and adapted to be engaged by the piston part, said adjustable stop means serving to adjust the working depth of the implement, and biasing means for normally maintaining the piston part against the stop means and the implement in its ground-working position.

3. In combination, a tractor having forward and rearward portions, ground-working implements connected to the forward portion of the tractor for vertical movement and located respectively on each side of the tractor, implements connected to the rearward portion of the tractor for vertical movement and located respectively on each side of the tractor, fore and aft movable levers respectively located on each side of the tractor intermediate the forward and rearward portions of the tractor, the implements on each side of the tractor connected respectively to the lever on the same side of the tractor, a power arrangement for moving the implements including separate actuating means located respectively at each side of the tractor and connected respectively to the lever on that side of the tractor.

4. In combination, a tractor having forward and rearward portions, ground-working implements connected to the forward portion of the tractor for vertical movement and located respectively on each side of the tractor, implements connected to the rearward portion of the tractor for vertical movement and located respectively on each side of the tractor, fore and aft movable levers respectively located on each side of the tractor intermediate the forward and rearward portions of the tractor, the implements on each side of the tractor connected respectively to the lever on the same side of the tractor, a power arrangement for moving the implements including separate actuating means located respectively at each side of the tractor and connected respectively to the lever on that side of the tractor, and manual adjusting means associated with each of the actuating means, whereby the ground-working depth of the implements at one side of the tractor may be adjusted independently of the implements at the opposite side of the tractor.

5. In combination, a tractor having a body portion, implements connected respectively to the tractor at different locations thereon for movement from one position to another position, a fluid power arrangement including a reservoir housing connected to the body portion of the tractor, a lever pivotally connected to the implements for simultaneous movement of the same, said reservoir housing serving as means for the pivotal connection of the lever with the tractor, a fluid actuated means having relatively movable parts connected between the lever and the tractor.

6. In combination, a tractor having a body portion, implements connected respectively to the tractor at different locations thereon for movement from one position to another position, a fluid power arrangement including a reservoir housing connected to the body portion of the tractor, a lever pivotally connected to the implements for simultaneous movement of the same, said reservoir housing serving as means for the pivotal connection of the lever with the tractor, a fluid actuated means having relatively movable parts connected between the lever and the tractor, and means carried by the fluid actuated means for limiting the amount of movement of the parts relative to each other whereby an adjustment of the implements in one of their positions may be effected.

7. In combination, a tractor having forward and rearward portions, an operator's station on one of said portions, a ground-working implement connected to one of said portions for vertical movement with respect thereto, a fore and aft movable lever connected to the tractor intermediate the forward and rearward portions, means for connecting the implement to the lever, and a fluid power arrangement including a fluid actuated device having a cylinder part and a piston part movable within the cylinder part, means anchoring the cylinder to the tractor, means operably connecting the piston part to said lever wherefore a stroke of the piston in one direction pursuant to energization of the fluid actuated device is operable through said lever to elevate said implement and wherefore gravitational force incurred in such implement is effective for causing a return stroke of the piston when said device is deenergized, means for adjusting the amount of said return stroke of the piston part to vary the ground-working depth of the implement, and said fluid actuated device extending to a location near to the operator's station whereby the adjusting means will be readily available to the operator's station.

8. In combination, a tractor having forward and rearward portions, an operator's station on one of said portions, a ground-working implement connected to one of said portions for vertical movement with respect thereto, a fluid power arrangement for moving the implement including a fluid pump housing connected to the tractor intermediate the forward and rearward portions and a fluid actuated device having a cylinder part and a piston part movable within the cylinder part, a fore and aft movable lever connected to the pump housing whereby said pump housing serves as a means for connecting the lever to the tractor, means for connecting the ground-working implement to the lever, manual means carried by the fluid actuated device for adjusting the working depth of the implement, and said fluid actuated device connected to said lever and extending to a location near to the operator's station whereby the adjusting means will be readily available to the operator's station.

HIRAM P. SMITH.